Aug. 16, 1960     W. G. LANGTON     2,949,536
METHOD AND MEANS FOR VERTICAL ATTITUDE DETERMINATION
Filed Feb. 4, 1957     2 Sheets-Sheet 1

INVENTOR.
WILLIAM G. LANGTON
BY
ATTORNEYS

United States Patent Office 2,949,536
Patented Aug. 16, 1960

2,949,536

METHOD AND MEANS FOR VERTICAL ATTITUDE DETERMINATION

William G. Langton, Lincoln, Mass., assignor to the United States of America as represented by the Secretary of the Air Force Filed Feb. 4, 1957, Ser. No. 638,188

16 Claims. (Cl. 250—201)

This invention relates to control of objects in flight and more particularly to objects operating at very high altitudes wherein the true vertical attitude with respect to the earth is determined precisely for control purposes.

This invention provides a system for vertical determination at very high altitudes based on observation around 360° azimuth scan. This determination of the direction of the vertical is made by observing the earth's horizon and utilizing it as a referent.

At the very high altitudes for which this system is to operate, no light comes from the sky above the horizon zone of the earth; only the horizon zone of the earth (which herein means the entire region below the junction line between earth and sky, including therein the earth and its atmosphere and clouds) reflects light. The horizon zone in some wavelength regions, as in light, will be quite distinct, and will present a signal sufficiently strong to be detected easily.

In an airborne system, a window may be made to sweep the entire horizon zone, while a light detector measures the amount of light coming through the window. If the axis of sweep is vertical, then the fraction of window area occupied by the horizon zone is constant throughout the sweep, so that the output of the light detector is constant. If the axis of sweep is tilted, then the horizon zone will appear to rise and fall in the window during a sweep. This causes variation of the light detector output. The amplitude and phase of the output variation will indicate the degree and direction of the tilt of the sweep axis. However, where a sector of the horizon zone is clouded, then that sector will reflect more light than normal, causing a false indication of tilt. To eliminate this possibility, a second window may be made to sweep with the first, but it views the area just below the horizon zone discontinuity. Where clouds exist, this second window provides a signal which may be used to remove false indications of tilt.

The aforesaid system involves viewing the earth's limb through two windows that are scanned around the horizon zone, deviations from the vertical result in a periodic variation in the instantaneous rates of brightness entering two windows. The period of variation is the time for one complete 360° scan. The variations may be used as an error signal whose phase indicates the direction of departure from the vertical. The system is oriented so that the horizon always intersects the upper window, and the lower one is always below the horizon zone.

However, there are certain limitations where two windows are utilized as there would be a requirement to provide two light detectors. There would be some instabilities introduced as a result thereof. Therefore, in a preferred embodiment of this invention one window and an associated light detector is utilized. The light through the upper half of the aforementioned window is chopped at one frequency, while the light through the lower half of the window is chopped at a different frequency; thus two signals are generated, corresponding to the two windows described above. Chopping is achieved by rotating the optical apparatus while the optical path is periodically interrupted by a stationary chopper. The system is oriented so that the horizon zone always appears in the field of view of one frequency window and partially in the field of view of the other frequency window, thus the radiant discontinuity of the horizon zone is observed. Deviation from the vertical results in a periodic variation in the instantaneous ratio of the amplitude of the two frequencies; the period of variation is the time for one complete 360° scan. This variation is utilized as an error signal whose phase indicates the direction of departure from the vertical. The system is provided with two generators which rotate with the optical apparatus and generates two reference voltages 90° out of phase with respect to each other. The error signal is phase compared with these reference voltages. The difference in phase of error signal and first and second reference voltages indicate the deviation from vertical in the X and Y directions respectively.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
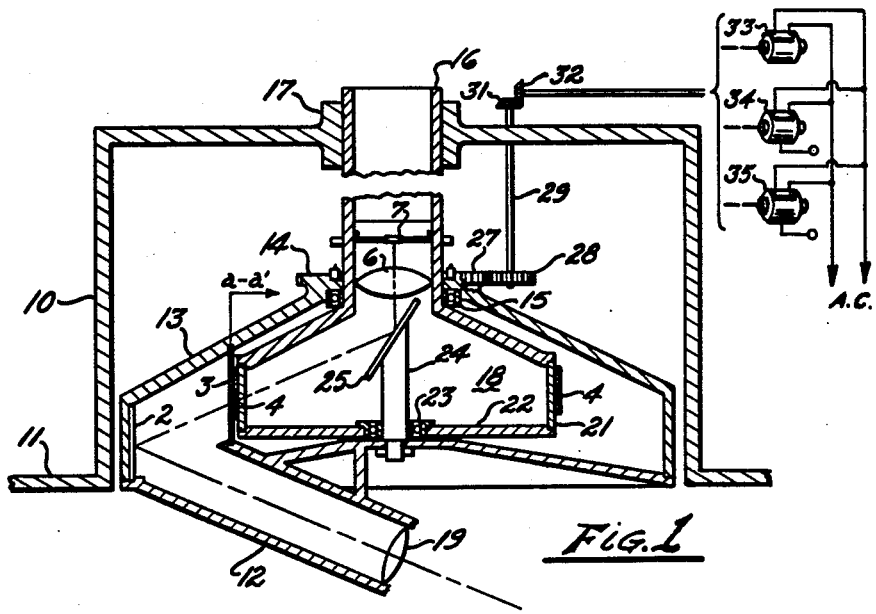
Fig. 1 is a view partly in section and partly schematic of the optical horizon zone scanner.

The scanning apparatus is shown in Fig. 1 as embodied in a substantially cylindrical housing 10 having a circular flange 11 for attachment (by suitable means, not shown) to some appropriate surface on the framework of the carrying craft, in such a manner as to permit the downwardly projecting sighting tube 12 to have unobstructed exposure for the reception of light signals from the earth's horizon zone as the said tube rotates about the central axis of the assembly. To facilitate such rotation the sighting tube is supported upon rotatable carriage 13 whose central hub position 14 receives ball bearing assembly 15 having its inner race supported upon a stationary hollow post 16 whose upper end is centrally positioned within, and secured to, the receiving boss 17 of the housing. Post 16 flares outwardly at its lower end to form the chamber 18 which houses an assembly of lenses and mirrors co-operating with lens 19 located in the outer end of the sighting tube. Chamber 18 has a cylindrical wall 21 to receive light-controlling windows, to be described, also a floor portion 22 centrally apertured to receive ball bearing assembly 23 whose inner race rotates with a post 24, extending upwardly from the rotating carriage 13. Post 24 carries a mirror 25 forming part of the light controlling assembly to be described.

On its outer surface the carriage hub 14 carries gear teeth 27 constituting a relatively large spur gear adapted to mesh with a pinion 28 supported on a shaft 29 journaled in housing 10, to receive from said shaft 29, by way of the bevel gear combination 31 and 32, the rotary motion of a suitable driving motor such as indicated at 33. As shown 33 is a motor energized by A.C. supply lines. Synchro generators 34 and 35 have their rotors mechanically driven by any suitable gear arrangement coacting with the rotation of motor 33. Synchro generator 34 is so adjusted that the zero azimuth position of the scanner will result in a null output from said synchro generator and one complete revolution of the scanner will produce one complete revolution in the generator 34. Synchro generator 35 is adjusted so that its output is 90° out of phase with that of generator 34. The synchro generators 34 and 35 are incorporated in reference generators 9 and 10 respetcively which are shown in Fig. 5.

Figure 3:
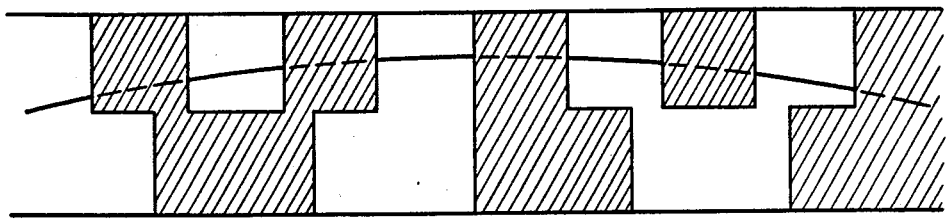
Fig. 3 shows the configuration of the rotating aperture and field of view therethrough.
Figure 4:
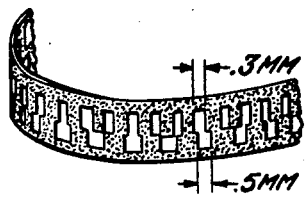
Fig. 4 shows the periodic structure of the stationary aperture.

In practicing our invention we provide an airborne optical horizon scanner as shown in Fig. 1. The horizon is viewed by means of primary objective lens 19, then it is reflected from mirror 2 and imaged in its focal plane $a$—$a'$. Aperture 3 with a configuration as shown in Figure 3 is mounted in focal plane $a$—$a'$ and rotates with objective lens 19. The transmitted light passes through aperture 3 then passes through stationary aperture 4 with a periodic structure as shown in Fig. 4. The upper half of the stationary aperture 4 has opaque and clear openings of the same width as the upper part of the rotating aperture 3, and the lower half of stationary aperture 4 corresponds to the lower part of rotating aperture 3; thus, an effective chopping with two frequencies is achieved. We, thereby, have two frequency windows, one of which is represented by the upper half of the apertures, and the other by the lower half. The chopped light is reflected from 45° mirror 25 and imaged by means of lens 6 onto the surface of photoconductive cell 7. The output of photoconductive cell 7 consists of currents of two frequencies, the amplitude of one of which is modulated by the variation due to the deviation from the vertical at the azimuthal scanning frequency, and the amplitude of the other of which is constant in the case of uniform signal strength from the entire horizon zone. Since the local differences in the radiation modify both signals at the same rate, the ratio of amplitudes of the two signals is used as the error signal. The error signal will therefore not be affected by the local differences in the horizon zone brightness.

Figure 2:
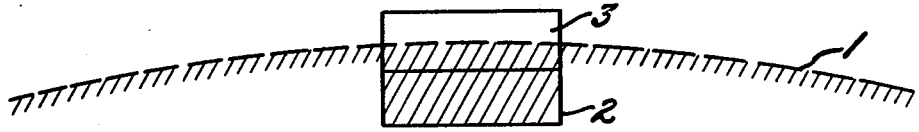
Fig. 2 is the field of view from the airborne horizon zone scanner.

Thus the earth's limb is viewed through an airborne optical scanner as shown in Fig. 1 which is equipped with a double frequency chopper. Chopping is achieved by rotating objective lens 18, mirror 2 and aperture 3 while the optical path is periodically interrupted by stationary aperture 4. Fig. 2 shows the scanner oriented so that horizon zone 1 always appears in the field of view of lower frequency window 2, corresponding to the lower half of the said apertures and partially in the field of view of upper frequency window 3 corresponding to the upper half of the said apertures.

Figure 5:
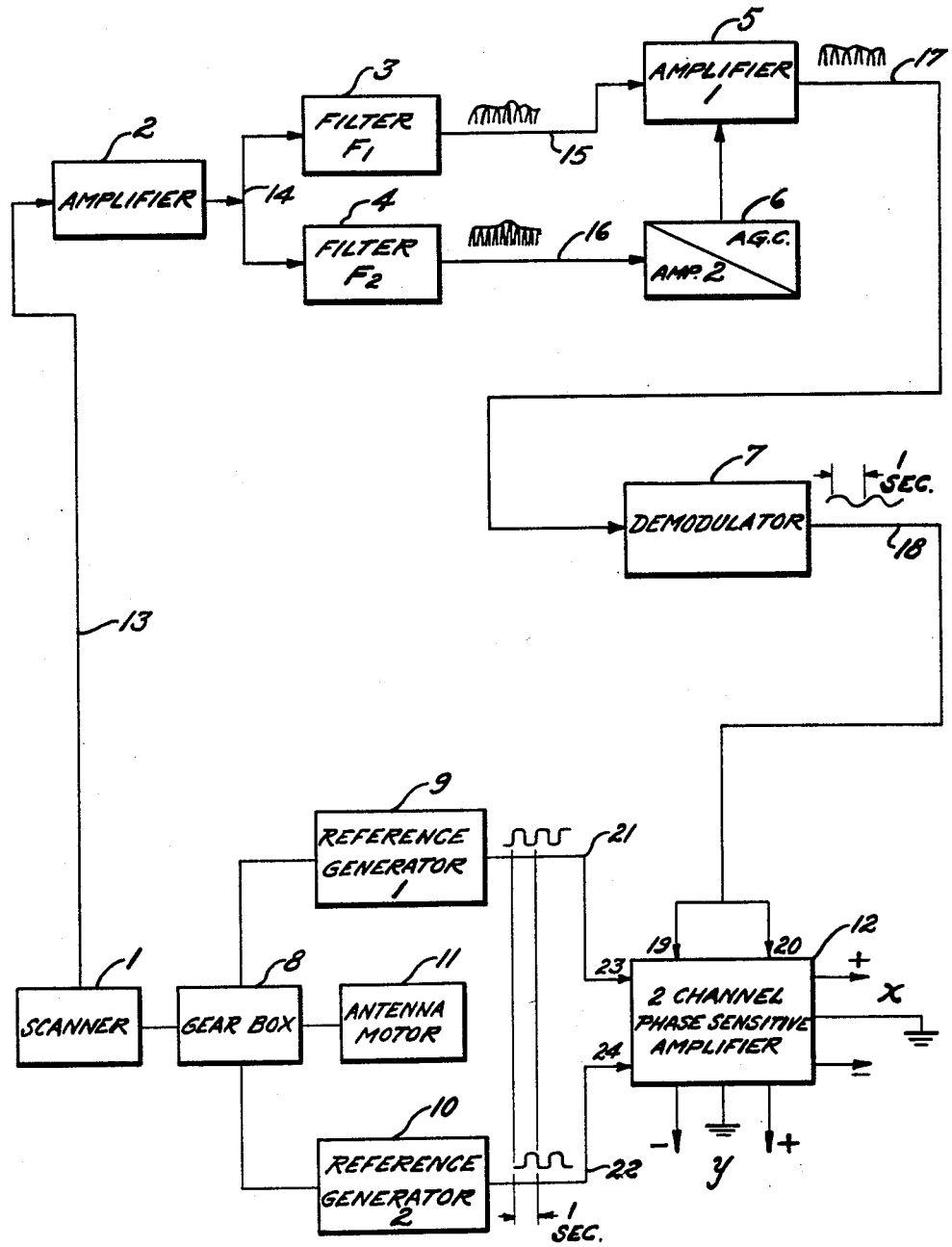
Fig. 5 represents the block diagram illustrating the general arrangement of the apparatus which is adapted to receive signals generated by the airborne horizon zone scanner, and to derive a signal to indicate the deviation from vertical in the X and Y directions.

Fig. 5 represents the block diagram of the entire system. Because of scanner 1 operation, the light from the upper part of the field of view, containing both horizon zone and sky, is chopped at one frequency, while the light from the lower part of field of view, containing just horizon zone, is chapped at a different frequency. A photoconductive cell contained in scanner 1 detects both light signals and converts them into electrical signals. The output from the photoconductive cell in scanner 1 is fed to amplifier 2 by way of line 13. The amplified output is then received by filters 3 and 4 by way of line 14. Filters 3 and 4 separate the two signals according to frequency. One of these signals, $F_2$, corresponds to the horizon zone alone, while the other, $F_1$, corresponds to both the sky and horizon zone. Signal $F_2$ is separated by filter 4 and signal $F_1$ by filter 3. The voltage waveforms at the output of filters 3 and 4 are shown on lines 15 and 16, respectively. The separated volts of frequency $F_1$ and $F_2$ are fed into amplifier 5 and 6, by way of lines 15 and 16 respectively. Amplifier 6 is provided with automatic-gain-control (AGC), and the AGC drive-down current is used regeneratively to control the gain of amplifier 5. The signal $F_2$ is thereby made to control the gain in amplifier 5, so that a cloudy sector of horizon zone causes decreased gain. The output of amplifier 5 in the sky-horizon circuit is unaffected by the clouds. Thus, the variation in earth limb brightness with azimuth does not appear in the output of amplifier 5. The output of amplifier 5, as demonstrated by voltage waveform as shown on line 17, is then the error signal representing the deviation from the vertical. The input to demodulator 7 varies only with the angle of tilt of scanner 1 sweep axis. Demodulator 7 receives its input by way of line 17 and the demodulated output waveform is shown on line 18. This output is fed to two channel phase sensitive amplifier 12 which has dual inputs 19 and 20.

Scanner motor 11 rotates scanner 1 by way of gear box 8. Simultaneously reference generators 9 and 10 on the scanner sweep axis rotate by way of gear box 8 and they generate two output reference voltages 90° out of phase with respect to each other. These reference voltages are fed to inputs 23 and 24 of two channel phase sensitive amplifier 12 by way of lines 21 and 22, respectively.

Two channel phase sensitive amplifier 12 is being fed from demodulator 7 an error signal and simultaneously two reference voltages 90° out of phase. The differences in phase of error signal and first and second reference voltages indicate the deviation from vertical in the X and Y directions, respectively. The information is now provided in terms of X and Y, the orientation of the axis of the object in flight with respect to the vertical. In this way, the horizon zone provides information leading to the precise determination of the vertical at very high altitudes.

In the embodiment small size and mass are important. Nevertheless, the diameter of the apertures must be large enough to allow reasonable carrier frequencies. Therefore for frequency, $F_1$, the width on the aperture of one transparent and one opaque section should be 1.0 mm.; and for frequency $F_2$, 0.6 mm. Using 2.5 inches for the diameter of the aperture, and an azimuthal scanning rate of one revolution per second, the frequencies are $F_1$ equals 200 c.p.s. and $F_2$ equals 333 c.p.s.

What is claimed is:

1. The method of determining the true vertical attitude of an object in flight at high altitudes with respect to the gravitational line from the said object to the earth comprising the steps of optically scanning in azimuth the horizon zone of the earth, orienting said optical scanning to view simultaneously a portion of the earth's horizon zone and its adjacent sky generating a pair of reference voltages corresponding to the $x$ and $y$ components of the instantaneous azimuthal position indicated by said scanning operation, generating a third voltage in a manner to cause its amplitude to vary in accordance with changes in the magnitude of signals being reflected back from said horizon zone and its adjacent sky, and continuously comparing the said third voltage to the said pair of reference voltages to determine the extent of deviation of the said object from the said vertical attitude.

2. The method of determining the true vertical attitude of an object in flight at high altitudes with respect to the gravitational line from the said object to the earth comprising the steps of optically scanning in azimuth simultaneously the horizon zone and its adjacent sky, generating a pair of reference voltages corresponding to the $x$ and $y$ components of the instantaneous azimuthal position indicated by said scanning operation, generating a second pair of voltages whose relative amplitudes vary in accordance with variations in the signal energy reflected from the said horizon zone and its adjacent sky, and continuously comparing the said two pairs of voltages to determine the extent of deviation of the said object from the said vertical attitude.

3. The method of determining the true vertical attitude of an object in flight at high altitudes with respect to the gravitational line from the said object to the earth comprising the steps of optically scanning in azimuth the horizon zone of the earth, orienting said optical scanning to view simultaneously a portion of the earth's horizon zone and its adjacent sky, generating a pair of reference voltages corresponding to the $x$ and $y$ components of the instantaneous azimuthal position indicated by said scanning operation, receiving a signal reflected from the said horizon zone and its adjacent sky during the said scanning operation, converting the said signal into two frequencies, utilizing the periodic variation in the instantaneous ratio of the amplitudes of the said two frequencies as an error signal when there is a deviation of the said object from the said vertical attitude, and comparing the phase of the said error signal to that of the said reference voltages to indicate the direction of said deviation.

4. The method of determining the true vertical attitude of an object in flight at high altitudes with respect to the gravitational line from the said object to the earth comprising the steps of optically, circularly scanning in azimuth about said gravitational line simultaneously the horizon zone of the earth and its adjacent sky, generating a pair of reference voltages corresponding to the $x$ and $y$ components of the instantaneous azimuthal position indicated by said scanning operation, receiving a signal reflected from the said horizon zone and its adjacent sky during the scanning operation wherein the said signal is representative of two adjacent regions in space, one of which regions embraces said horizon zone only and the other, said horizon zone and its adjacent sky, converting the said signal into two frequencies, utilizing the periodic variation in the instantaneous ratio of the amplitude of the said two frequencies as an error signal when there is a deviation of the said object from the said vertical attitude, and comparing the phase of the said error signal to that of the said reference voltages to indicate the direction of said deviation.

5. The method of determining the true vertical attitude of an object in flight at high altitudes with respect to the gravitational line from the said object to the earth comprising the steps of optically scanning in azimuth simultaneously the horizon zone of the earth and its adjacent sky, generating a pair of reference voltages corresponding to the $x$ and $y$ axis of the instantaneous azimuthal position indicated by said scanning operation, receiving a signal reflected from said two adjacent regions in space, one of which regions embraces the said horizon zone completely and the other, embracing said horizon zone and its adjacent sky during the said scanning operation, chopping the said signal into two frequencies, utilizing the periodic variation in the instantaneous ratio of the amplitudes of the said two frequencies as an error signal when there is a deviation of the said object from the said vertical attitude, and comparing the phase of the said error signal to that of the said reference voltages to indicate the direction of the said deviation from the said vertical attitude in the X and Y direction.

6. In an airborne system for determining the true vertical attitude of an object in flight at high altitudes with respect to the gravitational line from said object to the earth, an optical receiver disposed on said object, means for orienting said optical receiver so that it always views simultaneously a portion of the earth's horizon zone and its adjacent area, means for causing said optical receiver to execute cyclic, circular, azimuthal sweeps of said horizon zone and its adjacent sky about said gravitational line, means coacting with said sweeping means to generate a pair of orthogonally related reference voltages whose magnitude varies cyclically with each azimuthal sweep, means to convert a light signal received from said viewing into a pair of signals of differing frequencies, one of said frequencies being representative of an area embraced by said horizon zone only, and the other embracing an area of said horizon zone and its adjacent sky, means to produce a signal representing the instantaneous ratio of the amplitude of said pair of signals, and means to compare the phase of said instantaneous ratio signal to that of said reference voltages so that indication signals may be derived which will indicate the deviation of the said object from the said vertical attitude.

7. In a system as defined in claim 6 wherein said sweeping means includes an alternating current motor and driving connections between said motor and said optical device, and wherein said reference voltage generator means includes an alternating current generator converted for rotation in electrical synchronism with said motor.

8. In a system of the character described, an optical sighting device for cyclical azimuthal sweeping of the earth's horizon, and means for operating said sighting device cyclically, said means comprising a supporting housing surrounding said sighting device, a mounting post disposed centrally of said housing, a light-receiving compartment surrounding said mounting post, and means for rotatably supporting said compartment on the outer surface of said mounting post.

9. Apparatus as defined in claim 8, and including a second light-receiving compartment concentric with said first light-receiving compartment, said second compartment being an integral extension of said mounting post.

10. An airborne system for determining the true vertical attitude of an object in flight at extremely high altitudes with respect to the gravitational line from said object to the earth, an optical receiver disposed on said object, means for scanning with said receiver in repetitive circular azimuthal cycles, each successive cycle being constituted by a complete circular sweep of the horizon zone and its adjacent sky, about said gravitational line as the axis of said sweep, means to orient said sweep of said receiver so that it views simultaneously said horizon zone and its adjacent sky, means to convert the light reflected from said horizon zone and its adjacent sky to a pair of signals which differ in frequency, the first frequency being representative of an area of the horizon zone and its adjacent sky, the second frequency of an area of said horizon zone only, means to separately amplify each of said signals, means to gain control said first amplifying means with the output signal of said second amplifying means, means to demodulate the output signal from said first amplifying means, means coacting with said scanning means to generate a pair of orthogonally related reference voltages, means to compare the phase of said demodulated signal to that of said reference voltages so that signals may be derived which will indicate the deviation of said object from said vertical attitude.

11. In a system as defined in claim 10 wherein said means to convert the light reflected from said horizon zone and its adjacent sky to a pair of signals of differing frequency is comprised of a circular element surrounding said optical receiver and having successive peripheral segments of varying dimensions to form a repetitive pattern simultaneously embracing two areas, one of which includes said horizon zone and its adjacent sky, and the other of which includes only said horizon zone.

12. An airborne system for determining the true vertical attitude of an object in flight at extremely high altitudes with respect to the gravitational line from said object to the earth, an optical receiver disposed on said object, means for scanning with said receiver in repetitive circular azimuthal cycles about said gravitational line as the axis of sweep, said scanning means being oriented so that said optical receiver always views simultaneously a portion of the earth's horizon zone and its adjacent sky, means for converting the light received from said viewing into two signals of different frequency, the first of said frequencies being representative of said portion of horizon zone and adjacent sky and the second, of said horiozn zone only means coacting with said scanning means to generate a pair of orthogonally related reference voltages varying cyclically with each azimuthal sweep, means to generate a signal representing the instantaneous ratio of the amplitude of said pair of differing frequency signals, and means to compare the phase of said instantaneous ratio signal to that of said reference voltages so that indication signals may be derived which will indicate the deviation of said object from said vertical attitude.

13. In an airborne system for determining the true vertical attitude of an object in flight at extremely high altitudes with respect to the gravitational line from said object to the earth comprising an optical receiver disposed on said object, means for orienting said optical receiver so that it receives light signals in repetitive circular azimuthal cycles, each successive cycle being constituted by a complete circular sweep of the horizon zone and sky, about said gravitational line as the axis of sweep, means for controlling the range of light reception applicable to said optical receiver, said means comprising a circular element surrounding said optical receiver and having successive peripheral segments of varying dimensions to form a repetitive pattern simultaneously embracing adjacent areas, one of which includes a portion of supra-horizon zone space, and the other of which includes only horizon zone space, frequency generating means coacting with said light range controlling means to produce a pair of signals of differing frequencies, one of said frequencies being representative of supra-horizon zone space and the other of horizon zone space only, means coacting with said circular sweep to generate a pair of orthogonally related reference voltages whose magnitude varies cyclically with each of said azimuthal circular sweeps, means to produce a signal representing the instantaneous ratio of the amplitude of the said pair of differing frequency signals, and means to compare the phase of said instantaneous ratio signal to that of said pair of orthogonally related reference voltages so that indication signals may be derived which will indicate the deviation of said object from said vertical attitude.

14. An airborne system for determining the true vertical attitude of an object in flight at very high altitudes with respect to the gravitational line from said object to the earth comprising an optical receiver disposed on said object, means to orient said receiver to view the earth's horizon zone and its adjacent sky simultaneously, means to rotate said optical system in an azimuthal circular sweep with said gravitational line as the axis of said sweep, stationary means to chop the light signal received from said viewing during said rotation of said optical receiver into two light signals of differing frequencies, means to convert said differing frequency light signals into two corresponding electrical signals of differing frequencies, means to produce a signal representing the instantaneous ratio of the amplitude of said pair of electrical signals, means coacting with said rotating means to generate a pair of orthogonally related reference voltages, and means to compare the phase of said instantaneous ratio signal to that of said reference voltages so that indication signals may be derived which will indicate the deviation of the said object from said vertical attitude.

15. An airborne system for determining the true vertical attitude of an object in flight at very high altitudes with respect to the gravitational line from said object to the earth comprising an optical receiver disposed on said object, means to orient said receiver to view the earth's horizon zone and its adjacent sky simultaneously, means to rotate said receiver in an azimuthal circular sweep with said gravitational line as the axis of said sweep, stationary means to chop the light signal received from said viewing during said rotation of said receiver into two light signals, each light signal having a differing pulse frequency, the first frequency being representative of an area of said horizon zone and its adjacent sky, the second frequency, of an area of said horizon zone only, means to convert said first and second light signals into their corresponding electrical signals, separate amplifying means for each of said electrical signals, means to gain control said amplifying means for first said electrical signal by utilizing the output signal from the amplifying means for the second said electrical signal, means to demodulate the output signal of said amplifying means for said first electrical signal, means coacting with said rotating means to generate a pair of orthogonally related reference voltages, means to compare said demodulated signal to that of said reference voltages so that signals may be derived which will indicate the deviation of said object from said vertical attitude.

16. In a system as defined in claim 15, wherein said means to chop the received light into two light signals is comprised of a stationary circular element surrounded by said optical receiver and having successive peripheral segments of varying dimensions to form a repetitive pattern simultaneously embracing two areas, one of which includes said horizon zone and its adjacent sky, and the other of which includes only said horizon zone.

References Cited in the file of this patent

UNITED STATES PATENTS

| | | |
|---|---|---|
| 815,657 | Swasey | Mar. 20, 1906 |
| 2,513,367 | Scott | July 4, 1950 |
| 2,740,961 | Slater | Apr. 3, 1956 |
| 2,828,930 | Herbold | Apr. 1, 1958 |